Aug. 29, 1950     R. B. FAVOR     2,520,745
BREAKBACK MOWER

Filed Nov. 25, 1946     2 Sheets-Sheet 1

INVENTOR
Raymond B. Favor
BY
ATTORNEY

Aug. 29, 1950     R. B. FAVOR     2,520,745
BREAKBACK MOWER
Filed Nov. 25, 1946     2 Sheets-Sheet 2
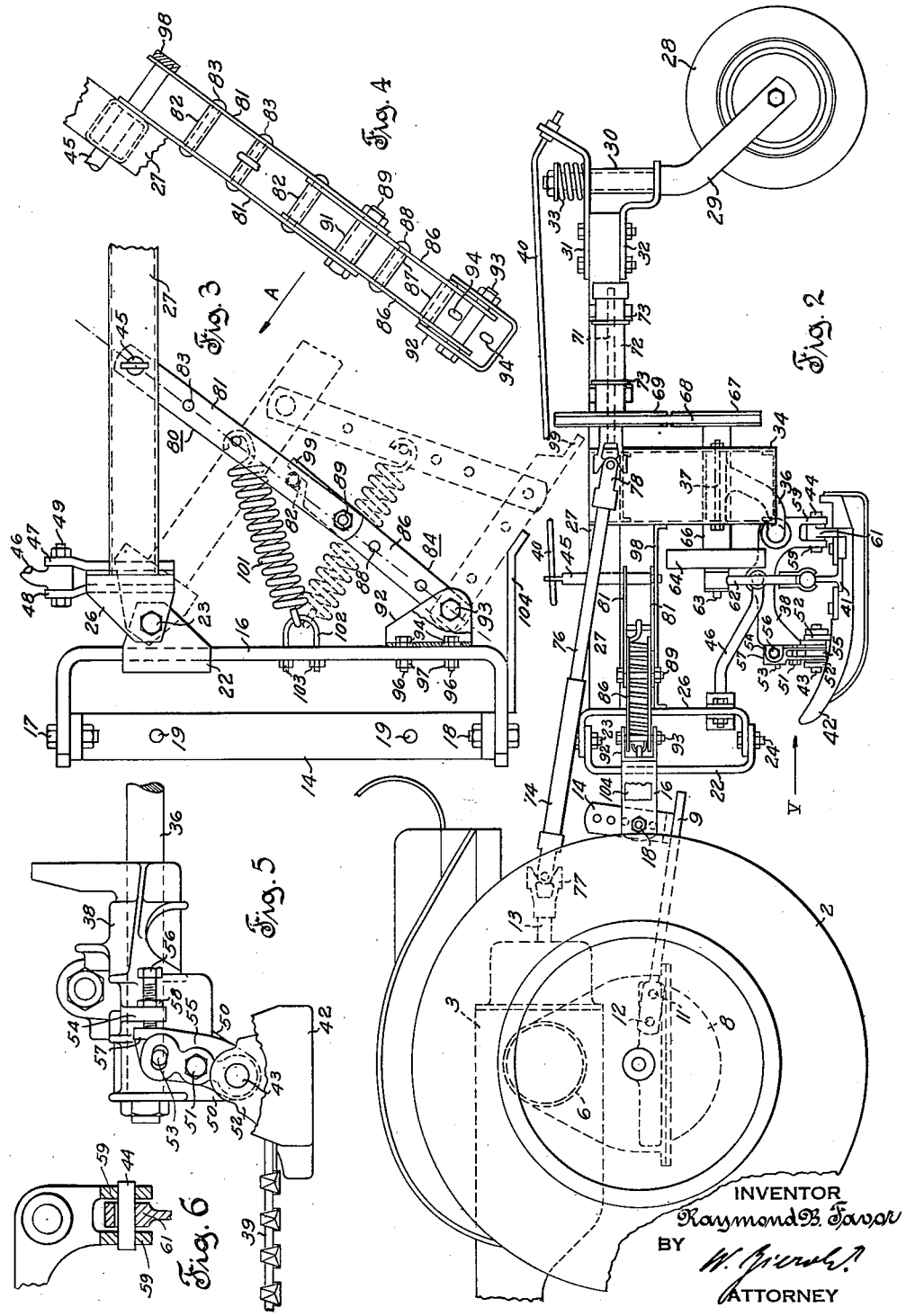
INVENTOR
Raymond B. Favor
BY
ATTORNEY Patented Aug. 29, 1950

2,520,745

UNITED STATES PATENT OFFICE 2,520,745

BREAK-BACK MOWER

Raymond B. Favor, La Crosse, Wis., assignor to Allis-Chalmers Manufacturing Company, Milwaukee, Wis., a corporation of Delaware Application November 25, 1946, Serial No. 712,147

14 Claims. (Cl. 56—25)

This invention relates in general to implement attachments for tractors, and it is concerned more particularly with an improved arrangement of attaching agricultural implements in propelled relation to a tractor.

The efficiency and satisfactory operation of certain types of tractor-implement combinations depends to a considerable extent, as is well known, on an accurate positioning of the implement in operative relation to the tractor, and it is also generally recognized that such accurate positioning of the implement, if required, has heretofore been difficult to achieve. One reason for this difficulty is the practical requirement that the relatively connectable and disconnectable parts by means of which the implement is secured in detachable relation to the tractor should be readily engageable with and separable from each other so that the implement can be conveniently attached to and detached from the tractor. That is, the mentioned connecting parts are preferably constructed to fit loosely upon each other, and if so constructed they lack the necessary precision for the desired accurate positioning of the implement relative to the tractor. Another reason for the mentioned difficulty is the high cost of precision manufacturing methods which would eliminate slight manufacturing variations and thus insure the desired accurate positioning of the implement relative to the tractor.

The foregoing considerations are particularly pertinent to tractor mowers of the sickle bar type which, as is well known, depend for satisfactory and efficient operation on a highly accurate positioning of the cutter and sickle bar assembly relative to the tractor. In such mowers the cutter and sickle bar assembly is subject to rearward deflection due to the cutting resistance encountered in normal operation, and in order to avoid binding of the sickle bar on the cutter bar due to such rearward deflection it is desirable to give the cutter and sickle bar assembly a proper lead relative to the tractor which will compensate said deflection. The mentioned lead places the outer end of the cutter bar assembly a relatively short distance ahead of a line at exactly right angles to the longitudinal center line of the tractor, for example, one and one quarter inches for a conventional cutter bar of five foot length, and it is apparent that under these circumstances accurate positioning of the cutter and sickle bar assembly relative to the tractor is particularly important.

Generally, it is an object of the invention to provide an improved arrangement of attaching agricultural implements in propelled relation to a tractor, and one which will take care of the mentioned requirement of a readily engageable and separable connection between the implement and the tractor, and of the requirement of accurately positioning the implement in operative relation to the tractor, in a practical and fully satisfactory manner.

More specifically, it is an object of the invention to provide an improved mowing implement of the cutter bar type which may be readily attached to and detached from a tractor, and which will be operable satisfactorily and at high efficiency regardless of slight manufacturing variations.

A further object of the invention is to provide an improved mowing implement of the character set forth hereinbefore incorporating a break-back mechanism which will protect the implement against damage under emergency conditions, as for instance when the cutter and sickle bar assembly is driven in its normal working position against an obstruction beyond which it cannot be advanced by the tractor.

A further object of the invention is to provide an improved break-back implement incorporating a toggle mechanism and a spring associated with the latter in such relation thereto as to control the break-back movement of the implement in a particularly desirable manner.

These and other objects and advantages are attained by the present invention, various novel features of which will be apparent from the description herein and accompanying drawings disclosing an embodiment of the invention, and will be more particularly pointed out in the claims.

In the drawings:

Fig. 2 is a side view of the tractor and mower assembly shown in Fig. 1;

Fig. 3 is an enlarged top view of a break-back mechanism incorporated in the mower shown in Figs. 1 and 2.

Fig. 4 is a rear view of the mechanism shown in Fig. 3 and taken in the direction of arrow A; and Fig. 5 is an end view of a cutter bar yoke and shoe assembly shown in Figs. 1 and 2, the view of Fig. 5 being taken in the direction of arrow V in Fig. 2.

Figure 6 is a view showing the relation of the cutter bar shoe to the yoke.

Figure 1:
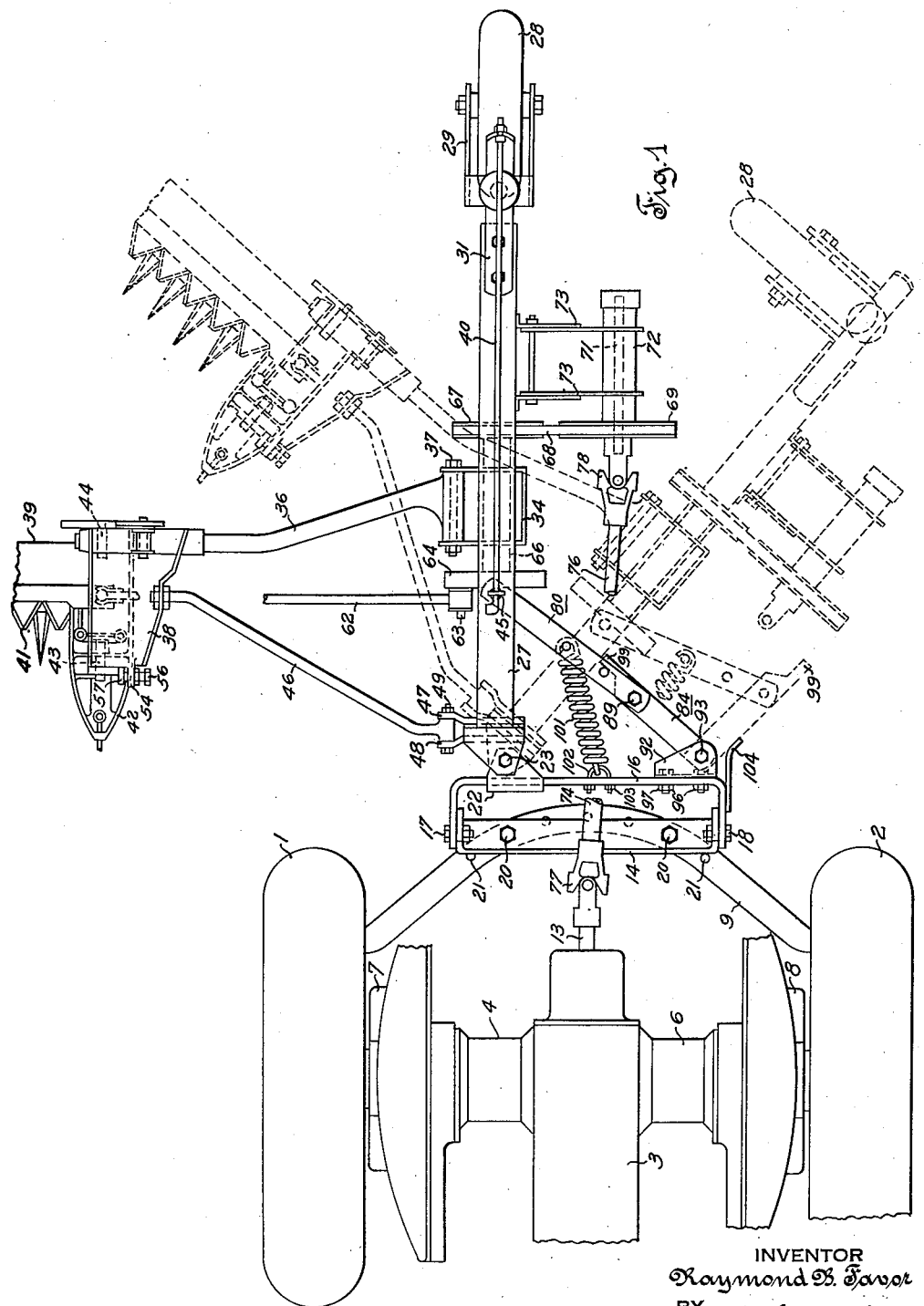
Fig. 1 is a top view of a trailing type break-back mower and of the rear end of a conventional type tractor connected with the mower.

Referring to Figs. 1 and 2, right and left rear wheels 1 and 2, respectively, of a conventional type tractor are mounted on a rear axle structure comprising a central gear casing 3, hollow side arms 4 and 6, and final drive casings 7 and 8 depending, respectively, from the outer ends of side arms 4 and 6 and on which the rear wheels are mounted in axial alignment with each other. A rearwardly arched draw bar 9 is mounted at its opposite ends on the final drive casings 7 and 8, respectively, a pivot pin 11 and a bolt 12, as indicated in Fig. 2, connecting each end of the draw bar with the adjacent final drive casing and securing the draw bar against vertical displacement relative to the tractor body from the position in which the draw bar is shown in Fig. 2. A power take-off mechanism including a power take-off shaft 13 is mounted in the central gear casing 3 and is operable by the tractor motor in conformity with conventional practice.

The mower shown in Figs. 1 and 2 in rear of the tractor is of the semi-mounted type, that is, it is equipped with a forward hitch structure by which it is partly sustained on the tractor, and with a rear support by which it is partly sustained on the ground and independently of the tractor.

The forward hitch structure for connecting the mower in supported relation to the tractor comprises a bracket or non-swingable hitch element 14 and a bail or swingable hitch element 16 which are hingedly connected with each other by means of two pivot bolts 17 and 18 at opposite ends, respectively, of the bracket 14. The bracket 14 is formed of a piece of strap metal, the opposite ends of wich are turned up and provided with holes for mounting of the bolts 17 and 18, and the straight portion of the bracket between its upturned ends has a pair of holes 19 (Fig. 3) for the reception of fastening bolts 20 (Fig. 1) which are passed through said holes and through registering holes of a series of holes 21 in the draw bar 9 so as to detachably secure the bracket in a transversely and vertically fixed position on the tractor. The swingable hitch bail 16 is likewise formed of a piece of strap metal which is bent into U-shape to provide forwardly extending ear portions which straddle the bracket 14 and have aligned holes for the reception of the bolts 17 and 18. The hitch bail 16 is thus connected with the tractor for pivotal movement about a horizontal transverse axis and in transversely fixed relation to the tractor, and the bolts 17 and 18 are suitably retained on the bracket 14 to provide for free pivotal movement of the hitch bail 16 about the common axis of the bolts 17 and 18.

The hitch bail 16 carries a U-shaped bracket 22, Fig. 2, which is rigidly secured, as by welding, to the hitch bail 16, Fig. 1, in proximity to the right end of the latter, that is, in proximity to the end of the hitch bail 16 which is connected to the bracket 14 by the bolt 17. The bracket 22 is formed of strap metal and extends at right angles to the hitch bail 16. The portion of the bracket 22 extending upwardly from the hitch bail 16 has a bent upper portion projecting rearwardly beyond the hitch bail 16, and the portion of the bracket 22 extending downwardly from the hitch bail 16 has a similarly bent lower portion projecting rearwardly beyond the hitch bail 16. Hingedly connected to the rearwardly projecting upper and lower portions of the bracket 22 by means of pivot bolts 23 and 24, as best shown in Fig. 2, is another bracket 26 which is substantially a duplicate of the bracket 22, an upper portion of the bracket 26 overlying the upper portion of the bracket 22 and having a hole in registry with a hole in the upper portion of the bracket 22 for the reception of the bolt 23, and the lower bent portion of the bracket 26 overlying the lower bent portion of the bracket 22 and having a hole in registry with a hole in the lower bent portion of the bracket 22 for the reception of the bolt 24. The bolts 23 and 24 are axially aligned with each other, and the bracket 26 is thus mounted for swinging movement about an axis in transversely fixed relation to the tractor.

The bracket 26 forms part of the frame structure of the mower, and it is rigidly secured, as by welding, to the forward end of a longitudinal frame member 27 which consists of a straight piece of square tubing and extends in right angle relation to the pivot axis afforded by the bolts 23 and 24. Operatively associated with the frame tube 27, at the rear end of the latter, is a caster wheel support comprising a rubber tired wheel 28 and a wheel fork 29. The wheel fork has a cylindrical spindle portion which is rotatably mounted in a bearing tube 30, and a pair of upper and lower bracket straps 31 and 32 rigidly mounting the bearing tube 30 are fixedly secured to the frame tube 27 by a pair of through bolts, as best shown in Fig. 2. A friction device for braking swivel movement of the caster wheel 28 is operatively interposed between the spindle portion of the wheel fork 29 and the upper bracket strap 31, the friction device being of conventional construction and comprising a compression spring 33, as shown in Fig. 2.

Rigidly secured to the frame tube 27, intermediate its front and rear ends is a depending bracket structure 34 (Fig. 2) to which a drag arm 36 (Fig. 1) is pivotally connected by means of a long pivot pin 37, the axis of the pivot pin 37 being disposed generally parallel to the frame member 27 and the drag arm 36 being freely swingable about said axis. Mounted on the outer end of the drag arm 36 in conventional manner is a cutter bar yoke 38 which forms part of a conventional cutting mechanism comprising a cutter bar 39, a reciprocable sickle bar 41, and an inner shoe 42, the inner shoe 42 being pivotally connected with the cutter bar yoke 38 by means of front and rear pivots 43 and 44, as best shown in Fig. 2. The yoke 38 is additionally connected with the frame structure of the mower by means of a diagonal rod 46. A pair of strap lugs 47 and 48 are welded to a lower portion of the bracket 26, and carry a pivot pin 49 which extends through an eye on the inner end of the rod 46. The cutting mechanism is thus connected with the frame structure of the mower for movement in unison therewith relative to the tractor about the vertical pivot axis afforded by the bolts 23 and 24, and about the horizontal pivot axis afforded by the pivot bolts 17 and 18.

The cutting mechanism may be raised and lowered by pivotal movement of the cutter bar 39 relative to the yoke 38 about the pivots 43 and 44 and by pivotal movement of the drag arm 36 relative to the mower frame about the axis of the pivot pin 37, in conformity with conventional practice, and a suitable mechanism, not shown, may be provided for that purpose and arranged in any convenient manner. For transport purposes, the cutter bar 39 may be swung upwardly about the pivots 43 and 44 Fig. 2 on the yoke 38 and retained in an upwardly tilted position by a stay rod 40 which is shown in Figs. 1 and 2 and which may be moved from the position in which it is shown in these figures into an attaching position with the cutter bar 39 in order to hold the latter in an upright transport position. The rod 40 is looped to a stud 45 on the frame member 27, and as shown in Figs. 1 and 2, rests in a slot of the bracket strap 31.

The forward connection between the cutter bar shoe 42 and the cutter bar yoke 38, as shown in Fig. 2, includes an adjustable mounting of the pivot pin 43 which is shown more clearly and in fuller detail in Fig. 5. Referring to Fig. 5, the cutter bar yoke 38 has a depending forward portion 50, in front of which a hanger 55 is pivotally mounted by means of a stud 51, the stud 51 extending through a central portion of the hanger 55 and being suitably mounted on the depending portion 50 of the yoke 38. The hanger 55 extends downwardly beyond the depending yoke portion 50 and is received, at its lower end, between upstanding lugs 52 (Fig. 2) on the shoe 42. The pivot pin 43 extends through aligned holes in the lugs 52 and through a registering hole in the lower end of the hanger 55, the shoe and the hanger being pivotally movable relative to each other about the axis of the pin 43. A pin and slot connection between the hanger 55, at the upper end of the latter, and the yoke 38 includes a pin 53 which is rigidly mounted on the yoke 38 and limits pivotal movement of the hanger 55 about the axis of the stud 51. Integrally formed with the yoke 38, at the forward end of the latter is a lug 54 which has a tapped hole for the reception of a set screw 56 on an axis above and at substantially right angles to the axis of the stud 51. The set screw 56 extends through the lug 54 and is abuttable with a lug portion 57 at the upper end of the hanger 55. A lock nut 58 on the set screw 56 may be drawn up against the lug 54 in order to secure the set screw in adjusted position on the yoke 38.

Referring again to Fig. 2, the rearward pivot pin 44 for the cutter bar shoe 42 extends through aligned holes in depending ears 59 of the cutter bar yoke 38 and through a registering hole in an upstanding lug 61 of the shoe 42, between the ears 59. The axial width of the lug 61 is slightly shorter than the axial spacing between the relatively opposed inner surfaces of the ears 59, and the diameter of the hole in the ear 61 is slightly larger than the diameter of the pin 44, so as to provide for horizontal angular displacement of the shoe 42 relative to the yoke 38 within the limits of the mentioned pin and slot connection at the upper end of the hanger 55 (Fig. 5).

A pitman 62 (Fig. 1) is operatively connected at one end, in conventional manner, with the inner end of the sickle bar 41, and the other end of the pitman is eccentrically connected by means of a crank pin 63 with a flywheel 64 which is rotatably mounted on the bracket structure 34 of the mower frame. The flywheel 64 is secured to the forward end of a supporting shaft which is journaled in a bearing tube 66, and a driving sheave 67 is secured to the flywheel shaft in rear of the bracket 34, as shown in Figs. 1 and 2. A belt 68 is trained over the driving sheave 67 and over another driving sheave 69 which is secured to the forward end of a driving shaft 71 at the left side of the frame tube 27, the shaft 71 being rotatably mounted in a bearing tube 72 which is supported on an elevated bracket structure 73 secured to the frame tube 27, as best shown in Fig. 1. The driving shaft 71 is connected in driven relation with the power take-off shaft 13 of the tractor by means of telescopic shaft sections 74 and 76 and universal joints 77 and 78, as best shown in Fig. 2.

Fig. 1 shows the mower in two positions behind the tractor, one, in full lines, which is the normal working position of the mower relative to the tractor and in which the cutter bar shoe 42 floatingly rides on the ground, and another position, in dashed lines, in which the frame and the cutting mechanism are angularly displaced relative to the tractor about the axis of the pivot bolts 23 and 24 so that the cutting mechanism occupies a rearwardly inclined non-working position.

A spring actuated toggle mechanism is operatively interposed between the hitch bail 16 and the frame member 27 for the purpose of releasably maintaining the cutting mechanism in the normal working position in which it is shown in full lines in Fig. 1. Referring to Figs. 3 and 4, a relatively long toggle link generally designated by the reference character 80 comprises two parallel identical bars 81 which are arranged one above the other and secured together in spaced relation to each other by spacers 82 and rivets 83. A second, relatively short toggle link generally designated by the reference character 84 comprises two parallel and identical bars 86 which are arranged one above the other and secured together in spaced relation to each other by spacers 87 and rivets 88. The outer surfaces of the bars 86 are spaced from each other a slightly shorter distance than the inner surfaces of the bars 81, and the short toggle link 84 is straddled by the bars 81 of the long toggle link 80 and is pivotally connected thereto by means of a pivot bolt 89 which is surrounded by a spacer bushing 91. The free end of the short toggle link 84, remote from the pivot 89, is pivotally mounted in a U-shaped bracket 92 by means of a pivot bolt 93. The bracket 92 has two oblong holes 94, Fig. 4, in its bottom portion for the reception of two mounting bolts 96 which extend through the hitch bail 16 and are drawn up by means of nuts 97 so as to secure the bracket in fixed position on the hitch bail 16. The oblong holes 94 permit adjustment of the bracket 92 on the hitch bail 16 transversely of the vertical pivot axis afforded by the pivot bolts 23 and 24 in order to provide for horizontal angling of the frame member 27 relative to the hitch bail 16, as will be discussed more fully hereinbelow.

Referring to Fig. 2, it will be noted that the hitch bail 16 and the bracket 92 are arranged in such vertical relation to the frame member 27 that the latter is located at a higher level than the bracket 92. The free end of the long toggle link 80 remote from the pivot pin 89 extends under the frame member 27 and is pivotally connected therewith by the mentioned stud 45 which extends vertically through the frame member 27 and is rigidly secured thereto, as by welding. A downwardly projecting cylindrical portion of the stud 45 extends through aligned holes in the upper and lower bars 81, and a rectangular strap 98 for the toggle link 80 and for the lower end of the stud 45 is rigidly secured at its forward end to the bracket 26 and at its rear end to the bracket structure 34.

Designating the pivotal connection between the frame 27 and the hitch bail 16 by means of the pivot bolts 23 and 24 as a first pivot center, and the pivotal connection between the toggle links 80 and 84 at 89 as a second pivot center, and further designating the pivotal connection of the short toggle link 84 with the hitch bail 16 at 93 as a third pivot center and the pivotal connection of the long toggle link 80 with the frame 27 at 45 as a fourth pivot center, it will be noted that in the position of the toggle mechanism as shown in full lines in Figs. 1 and 3, said second pivot center at 89 occupies a position in closed proximity to a line through the third and fourth pivot centers 93 and 45. In the mentioned full line position, the toggle links 80 and 84 are disposed at a slight angle relative to each other, which is preferably about three degrees, and the toggle links are prevented from moving into dead center relation, that is, into exact alignment with each other, by stops 99 which are formed, respectively, on the upper and lower bars 86 of the short toggle link 84 and which are laterally abuttable with the spacer 82 of the long link 80, next to the pivot 89, as best shown in Figs. 3 and 4. In other words, engagement of the stops 99 with the mentioned spacer 82 determines the toggle position in which the links 80 and 84 are shown in full lines in Figs. 1 and 3, and while the links 80 and 84 are prevented by said engagement of the stops 99 with the mentioned spacer 82 from overtraveling said toggle position they are free to break away from said toggle position into the folded position in which they are shown in dashed lines in Figs. 1 and 3.

The toggle links 80 and 84 are urged into the toggle position in which they are shown in full lines in Figs. 1 and 3 by a coil spring 101 which is anchored at one end thereof on the intermediate spacer 82 of the toggle link 80 and at the other end on a U-bolt 102 which is mounted on the hitch bail 16 intermediate the mentioned first pivot center at 23 and the mentioned third pivot center at 93. The legs of the U-bolt extend slidably through a pair of holes in the hitch bail 16, and the tension of the spring 101 may be adjusted by means of nuts 103 on the threaded legs of the U-bolt 102.

The toggle mechanism is arranged in such a manner, as stated, that when the cutting mechanism is located in its normal working position, as shown in full lines, the second pivot center at 89 is located in close proximity to the dead center line through the pivot connection at 93 on the hitch bail 16 and the pivot connection at 45 on the frame 27, and said arrangement, therefore, enables said toggle mechanism to exert a relatively high initial resistance against swinging movement of the frame 27 and the cutting mechanism 39, 41 from the full line position shown in Fig. 1 into the dashed line position in which the cutting mechanism occupies a rearwardly inclined non-working position.

As stated hereinbefore, the bracket 92 for the short toggle link 84 is adjustable on the hitch bail 16 in a direction transversely of the axis of the pivot bolts 23, 24 in order to provide for horizontal angling of the frame tube 27 relative to the hitch bail 16. It will now be seen that when the links 80 and 84 are in their full line toggle position, and when the bracket 92 is adjusted to a position in closer proximity to the axis of the pivot bolts 23, 24 the frame tube 27 will be swung about said axis toward the right of the tractor and as a result the outer end of the cutter bar 39, which is not shown but which is spaced a considerable distance from the pivot center at 23, will be moved forwardly relative to the tractor. Due to the greatly different lengths of the lever arms which are represented by the distance between the pivot centers 23 and 45 on the one hand, and by the distance between the pivot center 23 and the outer end of the cutter bar 39 on the other hand, a relatively small decrease or increase of the spacing between the pivot centers 23 and 93 will cause considerable forward or rearward displacement, respectively, of the outer end of the cutter bar relative to the tractor.

The non-swingable hitch bracket 14 is secured to the draw bar 9 of the tractor by means of a pair of bolts 20, as stated, which are passed through holes 19 is the bracket 14 and through registering holes of series of holes 21 in the draw bar 9. The connection by means of the bolts 20 is designed for ready attachment of the mower to and for detachment of the mower from the tractor, but said connection is not intended to be a precision connection which would secure the bracket 14 in an accurately determined position to the tractor at exactly right angles to the longitudinal center line of the latter, after the nuts on the bolts 20 have been drawn up to rigidly secure the bracket 14 to the draw bar 9.

For efficient and satisfactory operation of the cutting mechanism the sickle bar 41 must be freely reciprocable on the cutter bar 39, and in order to insure such reciprocation of the sickle bar without binding due to rearward deflection to which the cutter bar is subjected by the cutting resistance encountered in normal operation, the cutter bar must have a certain lead, that is, the outer end of the cutter bar must be so positioned with reference to the tractor that the mentioned deflection brings the outer end of the cutter bar into alignment with the inner end of the cutter bar on a line at exactly right angles to the longitudinal center line of the tractor. In other words, when the mower is set up preparatory to actual cutting, a point on the straight rear edge of the cutter bar at the outer end of the latter must be located a short distance ahead of a line extending at exactly right angles to the longitudinal center line of the tractor and through a point on the straight rear edge of the cutter bar at the inner end of the latter. For a conventional type cutter bar of five foot length the mentioned short distance should be about one and a quarter inches.

The mentioned accurate positioning of the outer end of the cutter bar with reference to the tractor preparatory to actual cutting may be readily accomplished in spite of lacking precision in the mounting of the bracket 14 on the tractor draw bar 9, and in spite of slight manufacturing variations in the mower as a whole, by adjustment of the bracket 92 on the hitch bail 16, which is provided for by the slotted holes 94 and the bolts 96, and by horizontal pivotal adjustment of the cutter bar 39 relative to the cutter bar yoke 38, which is provided for by the hanger 55 and by the set screw 56.

As a first step in setting up the mower for operation the hitch bracket 14 is rigidly secured to the tractor draw bar 9 by means of the bolts 20. It may then be found that the outer end of the cutter bar is considerably displaced from its mentioned proper position relative to the tractor, and the relatively short range of horizontal pivotal adjustment of the cutter bar 39 relative to the yoke 38 which, as stated, is limited by the pin and slot connection at the upper end of the hanger 55, may not be sufficient to bring the outer end of the cutter bar to its desired location, particularly if the frame tube 27 and the hitch bail 16 should not be positioned at exactly right angles to each other due to manufacturing irregularities. In that case the bracket 92 may be adjusted toward or away from the vertical pivot axis afforded by the pivot bolts 23, 24, as required, in order to bring the outer end of the cutter bar approximately to its correct location relative to the tractor. The set screw 56 may then be adjusted on the yoke 38 to perfect the cutter bar lead.

It will also be noted that horizontal angular adjustment of the frame tube 27 about the common axis of the pivot bolts 23, 24 by adjustment of the bracket 92 changes the position of the caster wheel support 28, 29 relative to the tractor, and the tracking position of the caster wheel support may thus be adjusted relative to the tractor.

When the cutter bar 39, in its normal working position, is driven against an obstruction beyond which it cannot be advanced by the tractor, as for instance against a rock or fence post, the resulting increased thrust upon the toggle links 80 and 84 will cause the latter to break away from their full line toggle position toward the folded position which is indicated in dashed lines in Figs. 1 and 3. During such movement of the toggle links the coil spring 101 will be somewhat elongated and, as a result, the coil spring will dampen the break-back movement of the cutting mechanism. Such break-back movement of the cutting mechanism may continue until the toggle link 84 hits a stop 104 which is secured to the hitch bail 16 at the left end of the latter, that is, at the end thereof which is connected to the bracket 14 by means of the pivot bolt 18. It will be understood that when the cutting mechanism is driven, in its normal working position, against an obstruction and as a result the links 80 and 84 break away from their full line toggle position, the tractor should be stopped before the link 84 hits the stop 104.

In order to recondition the mower for normal operation, after a break-back, it is only necessary to drive the tractor for a short distance in reverse while the cutting mechanism is left in contact with the ground. While the frame and cutting mechanism are being manipulated from the dashed line position to the full line position shown in Fig. 1, by reverse movement of the tractor, the tension of the coil spring 101 will be effective to assist such return movement of the frame and cutting mechanism into the normal operating position.

The spring 101 is anchored, as stated, at one end thereof by means of the U-bolt 102 on a portion of the hitch bail 16 intermediate the brackets 22 and 92, or in other words, between the axis of the pivot bolts 23, 24 and the axis of the pivot bolt 93, and the other end of the spring is anchored on the long link 80 at a point intermediate the pivot center of said link at 45 on the frame tube 27, and the pivot center at 89. The bight portion of the U-bolt 102 provides an arcuate track along which the forward end of the spring may follow when the toggle links move from their full line toggle position to the dashed line folded position, as indicated in Fig. 3. The anchoring of the spring 101 at its forward end in swingable and bodily shiftable relation to the hitch bail 16 is a desirable feature not only from a manufacturing standpoint but also from a performance standpoint. When the toggle mechanism moves from its full line initial position to its dashed line final position, the horizontal angular relation between the spring 101 and the short toggle link 84 changes continuously, and before the toggle mechanism arrives in its final position it passes through an intermediate position in which the spring and the link 84 extend parallel to each other. During movement of the mechanism from its initial to the mentioned intermediate position the tension of the spring 101 increases continuously but not uniformly, the increase of the spring tension becoming less rapid as the mechanism approaches the mentioned intermediate position. During movement of the mechanism from the mentioned intermediate position to its final position, the spring tension decreases at a relatively slow rate, and in the final position of the spring, which is indicated in dashed lines in Fig. 3, the spring is still approximately in the condition of maximum stretch to which it becomes subjected appreciably before the toggle mechanism arrives in its final position. Due to these operating characteristics of the spring 101 the break-back movement of the cutting mechanism is dampened in a desirable manner to cushion the impact of the toggle link 84 against the stop 104.

Features and advantages of the present invention will be apparent from the foregoing description of an embodiment of the invention in a tractor mower; but it is to be understood that it is not desired to limit the invention to the particular form and details described hereinabove and that the invention includes such other forms and modifications as are embraced by the scope of the appended claims.

It is claimed and desired to secure by Letters Patent:

1. In a mower attachment for tractors comprising a caster wheel-supported frame structure and universal joint means carried by said frame structure for attaching the latter in trailing relation to a source of draft, the combination of a cutter bar assembly operatively mounted on said frame structure, means for adjusting the lead of said cutter bar assembly relative to said frame structure, and means for angling said frame structure horizontally relative to an element of said universal joint means.

2. In an implement attachment for tractors comprising a frame structure and a caster-wheel-support operatively associated with said frame structure, the combination of a non-swingable hitch element adapted for mounting on a tractor, a swingable hitch element having one pivot axis on said non-swingable hitch element and another pivot axis on said frame structure at substantially right angles to said one pivot axis, and yieldable bracing means associated with said swingable hitch element for releasably securing said frame structure in a predetermined position of horizontal angular adjustment relative thereto, said bracing means comprising a pair of complementary elements pivotally uniting a portion of said frame structure with a portion of said swingable hitch element spaced, respectively, rearward and sideward from said pivot axis thereby affording a pair of reaction supports for the remote ends of said elements, and an adjustable connection between said bracing means and one of said reaction supports affording selective horizontal variation of said predetermined position of said frame structure.

3. In an implement attachment for tractors, the combination comprising a frame structure, a working unit operatively mounted on said frame structure, the combination of a non-swingable hitch element adapted for mounting on a tractor, a swingable hitch element having a horizontal pivot axis on said non-swingable hitch element and a vertical pivot axis on said frame structure, and yieldable bracing means operatively interposed between said swingable hitch element and said frame structure for releasably securing said frame structure in a predetermined position of horizontal angular adjustment relative thereto, said bracing means comprising a pair of complementary elements, pivotally uniting a portion of said frame structure with a portion of said swingable hitch element spaced, respectively, rearward and sideward from said pivot axis thereby affording a pair of reaction supports for the remote ends of said elements, and a connection between one of said reaction supports and the remote end of the complementary element associated therewith comprising a part adjustable toward or away from said vertical pivot axis to vary the horizontal angular relation of said hitch element and frame structure.

4. An implement attachment for tractors comprising a frame structure, a hitch element connected with said frame structure for swinging movement relative thereto about vertical and horizontal pivot axes and connectable in supported trailing relation with a tractor carried part, said hitch element including a portion extending laterally outward with respect to one side of said frame structure and with respect to said vertical pivot axis, a bracket element mounted on said portion of said hitch element for adjustment therealong toward or away from said vertical pivot axis, and bracing means operatively interposed between said bracket element and said frame structure.

5. An implement attachment for tractors comprising a frame having a rear portion thereof supported on a castering device, a hitch element pivotally connected with a forward portion of said frame at a first pivot center, a pair of links pivotally connected with each other at a second pivot center, means pivotally connecting one of said links, at a third pivot center, with said hitch element and the other of said links, at a fourth pivot center, with said implement frame, said links and pivot centers affording horizontal swinging movement of said implement frame relative to said hitch element and between limiting positions in one of which said second pivot center occupies a position in close proximity to a line through said third and fourth pivot centers, a coil spring, and anchoring elements for said coil spring associated, respectively, with said hitch element and with said other link, one of said anchoring elements being adjustable relative to the other independently of relative pivotal movement of said links.

6. An implement attachment for tractors comprising a frame having a rear portion thereof supported on a castering device, a hitch element pivotally connected with a forward portion of said frame at a first pivot center, a pair of links pivotally connected with each other at a second pivot center, means pivotally connecting one of said links, at a third pivot center, with said hitch element and the other of said links, at a fourth pivot center, with said implement frame, said links and pivot centers affording horizontal swinging movement of said implement frame relative to said hitch element and between limiting positions in one of which said second pivot center occupies a position in close proximity to a line through said third and fourth pivot centers, a coil spring, means anchoring said coil spring at one end thereof on said hitch element between said first and third pivot centers and in swingable and bodily shiftable relation to said hitch element, and means operatively anchoring said coil spring at the other end thereof on said other link intermediate said second and fourth pivot centers.

7. An implement attachment for tractors comprising a frame having a rear portion thereof supported on a castering device, a hitch element pivotally connected with a forward portion of said frame at a first pivot center, a pair of links pivotally connected with each other at a second pivot center, means pivotally connecting one of said links, at a third pivot center, with said hitch element and the other of said links, at a fourth pivot center, with said implement frame, said links and pivot centers affording horizontal swinging movement of said implement frame relative to said hitch element and between limiting positions in one of which said second pivot occupies a position in close proximity to a line through said third and fourth pivot centers and in the other of which said first pivot center occupies a position in outward rearward relation with respect to said third pivot center, a U-bolt mounted on said hitch element intermediate said first and third pivot centers, and a coil spring hooked at one end thereof to said U-bolt and anchored at its other end on said other link intermediate said second and fourth pivot centers.

8. An implement attachment for tractors comprising a frame having a rear portion thereof supported on a castering device, a hitch element pivotally connected with a forward portion of said frame at a first pivot center, a pair of links pivotally connected with each other at a second pivot center, means pivotally connecting one of said links, at a third pivot center, with said hitch element and the other of said links, at a fourth pivot center, with said implement frame, said links and pivot centers affording horizontal swinging movement of said implement frame relative to said hitch element and between limiting positions in one of which said second pivot center occupies a position in close proximity to a line through said third and fourth pivot centers, a coil spring, anchoring elements for said coil spring associated, respectively, with said hitch element and with said other link, one of said anchoring elements being adjustable relative to the other independently of relative pivotal movement of said links, and means affording adjustment of said third pivot center transversely relative to said first pivot center to thereby horizontally adjust the rear portion of said frame laterally with respect to the direction of travel.

9. An implement attachment for tractors comprising a frame having a rear portion thereof supported on a castering device, a working unit mounted on said frame and positionable in generally horizontally laterally extending relation with respect to a side thereof, a hitch element pivotally connected with a forward portion of said frame at a first pivot center, a pair of links pivotally connected with each other at a second pivot center, means pivotally connecting one of said links, at a third pivot center, with said hitch element and the other of said links, at a fourth pivot center, with said implement frame, said links and pivot centers affording horizontal swinging movement of said implement frame relative to said hitch element and between limiting positions in one of which said second pivot center occupies a position in close proximity to a line through said third and fourth pivot centers, a coil spring, anchoring elements for said coil spring associated, respectively, with said hitch element and with said other link, one of said anchoring elements being adjustable relative to the other independently of relative pivotal movement of said links, means affording adjustment of said third pivot center transversely relative to said first pivot center to thereby horizontally adjust the rear portion of said frame laterally with respect to the direction of travel, and means independently operable for adjusting the lead of said working unit relative to said frame.

10. For use with a tractor, the combination of a caster wheel-supported implement frame, a working unit positionable in laterally disposed relation to said frame, hitch means connectable with a source of draft and pivotally connected with said frame for horizontal swinging movement of said frame relative to said hitch means, means including relatively adjustable connecting elements associated, respectively, with said frame and working unit and operatively mounting the latter on said frame in horizontally adjustable relation thereto, and adjusting means operatively associated with said frame and hitch means for angling the former horizontally relative to the latter.

11. A mower attachment for tractors comprising, in combination, a frame structure operatively mounting a cutter bar assembly positionable in laterally disposed relation to said frame, hitch means connectable with a source of draft and pivotally connected with said frame in a manner affording horizontal swinging movement of said frame relative to said hitch means, bracing means adjustably associated with said frame and hitch means for angling said frame horizontally relative to said hitch means, and means operatively associated with said cutter bar assembly and being operable independently of said bracing means for adjusting the lead of said cutter bar assembly.

12. In an implement attachment for tractors having a caster wheel-supported frame structure and having a hitch structure comprising one part securable in fixed relation to a source of draft and a second part associated with said one part for swinging movement relative thereto about a normally horizontal axis and associated with said frame in a manner affording swinging movement of said frame structure relative to said hitch structure about a normally vertical axis, an improved bracing means releasably securing said frame in a predetermined position of horizontal angular adjustment relative to said hitch structure and comprising a pair of complementary bracing elements pivotally connected together and pivotally uniting a portion of said frame with a portion of said second part laterally offset from said portion of said frame thereby affording a pair of reaction supports for the remote ends of said elements, and a connection between one of said bracing elements and its reaction support comprising a part adjustable toward or away from said vertical pivot axis to selectively vary the horizontal angular relation of said second hitch part and frame structure.

13. In a mower attachment for tractors comprising a caster wheel-supported frame structure and a cutter bar assembly operatively mounted on said frame, the combination of hitch means comprising one part securable in fixed relation to a source of draft and a second part associated with said one part for vertical swinging movement relative thereto and associated with said frame in a manner affording horizontal swinging movement of said frame relative to said hitch means, yieldable bracing means releasably securing said frame in a predetermined position of horizontal angular adjustment relative to said hitch means and comprising a pair of complementary bracing elements pivotally uniting a portion of said frame to the rear of said hitch means with a portion of said hitch means laterally spaced from said portion of said frame thereby affording a pair of reaction supports for the remote ends of said elements, and a connection between one of said elements and its reaction support comprising a part affording adjustment of the latter in a direction effective to vary the horizontal angular relation of said second hitch part and frame structure, and means operatively associated with said cutter bar assembly for adjusting the lead thereof relative to said frame independently of adjustment afforded by said complementary bracing elements.

14. An implement attachable in trailing relation to a tractor and comprising a first hitch element securable in fixed relation to a tractor carried part, a second hitch element mounted for swinging movement about a horizontal pivot axis afforded by means carried by said first hitch element, a frame structure secured to said second hitch element through a vertical pivot means affording horizontal swinging movement of said frame structure relative to said second hitch element, said second hitch element extending laterally outward with respect to one side of said frame structure and with respect to said vertical pivot axis, a bracket element mounted on said second hitch element for adjustment therealong toward or away from said vertical pivot axis, and bracing means operatively interposed between said bracket element and said frame structure.

RAYMOND B. FAVOR.

REFERENCES CITED

The following references are of record in the file of this patent:

UNITED STATES PATENTS

| Number | Name | Date |
|---|---|---|
| 843,993 | Breen | Feb. 12, 1907 |
| 917,603 | Hench | Apr. 6, 1909 |
| 2,198,910 | Everett | Apr. 30, 1940 |
| 2,225,156 | Coultas | Dec. 17, 1940 |
| 2,284,003 | Luppert | May 26, 1942 |
| 2,291,987 | Rogers | Aug. 4, 1942 |
| 2,314,215 | Hilblom | Mar. 16, 1943 |
| 2,331,863 | Schroeppel | Oct. 12, 1943 |

Certificate of Correction

Patent No. 2,520,745                                                        August 29, 1950

RAYMOND B. FAVOR

It is hereby certified that error appears in the printed specification of the above numbered patent requiring correction as follows:

Column 11, line 10, after the word "elements" strike out the comma;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*